United States Patent
Malik

(10) Patent No.: US 8,713,013 B2
(45) Date of Patent: *Apr. 29, 2014

(54) METHODS, SYSTEMS, AND PRODUCTS FOR SEARCHING INTERACTIVE MENU PROMPTING SYSTEMS

(75) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/500,660

(22) Filed: Jul. 10, 2009

(65) Prior Publication Data

US 2009/0276441 A1    Nov. 5, 2009

Related U.S. Application Data

(63) Continuation of application No. 11/303,132, filed on Dec. 16, 2005, now Pat. No. 7,577,664.

(51) Int. Cl.
    *G06F 17/30*    (2006.01)
(52) U.S. Cl.
    USPC ........... 707/736; 707/758; 707/781; 707/791; 707/802; 725/37; 715/700
(58) Field of Classification Search
    USPC ......... 707/736, 758, 781, 791, 802, 999.003, 707/999.1; 725/37; 715/700
    See application file for complete search history.

(56) References Cited

U.S. PATENT DOCUMENTS

| | | |
|---|---|---|
| 4,142,067 A | 2/1979 | Williamson |
| 4,788,715 A | 11/1988 | Lee |
| 5,309,505 A | 5/1994 | Szlam et al. |
| 5,455,853 A | 10/1995 | Cebulka et al. |
| 5,553,121 A | 9/1996 | Martin et al. |
| 5,867,572 A | 2/1999 | MacDonald |
| 5,872,834 A | 2/1999 | Teitelbaum |
| 6,016,336 A | 1/2000 | Hanson |
| 6,044,382 A | 3/2000 | Martino |
| 6,064,730 A | 5/2000 | Ginsberg |
| 6,104,790 A | 8/2000 | Narayanaswami |
| 6,112,172 A | 8/2000 | True et al. |
| 6,122,346 A | 9/2000 | Grossman |
| 6,240,448 B1 | 5/2001 | Imielinski et al. |
| 6,243,684 B1 | 6/2001 | Stuart et al. |
| 6,370,238 B1 | 4/2002 | Sansone et al. |
| 6,421,672 B1 * | 7/2002 | McAllister et al. ................ 1/1 |
| 6,456,619 B1 | 9/2002 | Sassin et al. |
| 6,487,277 B2 | 11/2002 | Beyda et al. |
| 6,510,434 B1 | 1/2003 | Anderson et al. |
| 6,584,181 B1 | 6/2003 | Aktas et al. |
| 6,665,644 B1 | 12/2003 | Kanevsky et al. |
| 6,690,776 B1 | 2/2004 | Raasch |
| 6,714,643 B1 | 3/2004 | Gargeya |
| 6,718,017 B1 | 4/2004 | Price et al. |

(Continued)

FOREIGN PATENT DOCUMENTS

WO    WO 2004/040889    5/2004

*Primary Examiner* — Syling Yen
(74) *Attorney, Agent, or Firm* — Scott P. Zimmerman, PLLC

(57) ABSTRACT

Methods, systems, and products are disclosed for searching a searchable listing of an interactive menu prompting system. A search request is received, and the search request includes a search term. A query is sent to determine whether the search term occurs within in the searchable listing. A search result is received and communicated to a client.

19 Claims, 17 Drawing Sheets

(56) References Cited

U.S. PATENT DOCUMENTS

| | | |
|---|---|---|
| 6,738,473 B1 | 5/2004 | Burg |
| 6,754,333 B1 | 6/2004 | Flockhart et al. |
| 6,775,264 B1 | 8/2004 | Kurganov |
| 6,798,877 B2 | 9/2004 | Johnson |
| 6,801,620 B2 | 10/2004 | Smith |
| 6,820,260 B1 | 11/2004 | Flockhart |
| 6,842,767 B1 | 1/2005 | Partovi |
| 6,853,966 B2 | 2/2005 | Bushey |
| 6,885,733 B2 | 4/2005 | Pearson et al. |
| 6,922,466 B1 | 7/2005 | Peterson et al. |
| 6,934,684 B2 * | 8/2005 | Alpdemir et al. ............ 704/265 |
| 6,944,592 B1 | 9/2005 | Pickering |
| 6,965,664 B1 | 11/2005 | McIntosh et al. |
| 7,023,837 B1 * | 4/2006 | Srinivasan .................... 370/352 |
| 7,043,435 B2 | 5/2006 | Knott et al. |
| 7,050,990 B1 | 5/2006 | Chu et al. |
| 7,065,188 B1 | 6/2006 | Mei et al. |
| 7,257,217 B1 | 8/2007 | Lee |
| 7,295,668 B2 | 11/2007 | Singer |
| 7,386,103 B1 | 6/2008 | Chahal |
| 7,436,948 B1 | 10/2008 | Thenthiruperai |
| 2001/0024497 A1 | 9/2001 | Campbell |
| 2003/0005076 A1 | 1/2003 | Koch et al. |
| 2003/0035531 A1 | 2/2003 | Brown et al. |
| 2003/0039341 A1 * | 2/2003 | Burg et al. ................ 379/88.16 |
| 2003/0041314 A1 | 2/2003 | Heeren et al. |
| 2003/0061029 A1 | 3/2003 | Shaket |
| 2003/0112952 A1 | 6/2003 | Brown |
| 2003/0191648 A1 | 10/2003 | Knott et al. |
| 2003/0195748 A1 | 10/2003 | Schalkwyk |
| 2003/0232640 A1 | 12/2003 | Walker |
| 2004/0006476 A1 | 1/2004 | Chiu |
| 2004/0019646 A1 | 1/2004 | Zweben et al. |
| 2004/0042592 A1 | 3/2004 | Knott |
| 2004/0042593 A1 | 3/2004 | Gulrajani et al. |
| 2004/0120479 A1 | 6/2004 | Creamer et al. |
| 2004/0153322 A1 | 8/2004 | Neuberger et al. |
| 2004/0204116 A1 * | 10/2004 | Ben-Efraim et al. ......... 455/564 |
| 2004/0205731 A1 | 10/2004 | Junkermann |
| 2004/0215757 A1 | 10/2004 | Butler |
| 2004/0267613 A1 | 12/2004 | Chan et al. |
| 2005/0008141 A1 | 1/2005 | Kortum |
| 2005/0027536 A1 | 2/2005 | Matos |
| 2005/0060304 A1 | 3/2005 | Parikh |
| 2005/0069122 A1 | 3/2005 | Lin |
| 2005/0081152 A1 | 4/2005 | Commarford et al. |
| 2005/0129252 A1 | 6/2005 | Heintzman et al. |
| 2005/0135338 A1 | 6/2005 | Chiu et al. |
| 2005/0137875 A1 | 6/2005 | Kim et al. |
| 2005/0171779 A1 | 8/2005 | Joublin |
| 2005/0234891 A1 | 10/2005 | Walther et al. |
| 2005/0246174 A1 | 11/2005 | DeGolia |
| 2005/0256866 A1 | 11/2005 | Lu et al. |
| 2006/0165104 A1 | 7/2006 | Kaye |
| 2006/0190825 A1 | 8/2006 | Zaag |
| 2006/0251237 A1 | 11/2006 | Singer |
| 2006/0294192 A1 | 12/2006 | Mao et al. |
| 2007/0101394 A1 | 5/2007 | Fu et al. |
| 2007/0116195 A1 | 5/2007 | Thompson et al. |
| 2007/0185858 A1 * | 8/2007 | Lu et al. ............................ 707/5 |
| 2007/0204025 A1 | 8/2007 | Cox et al. |

* cited by examiner

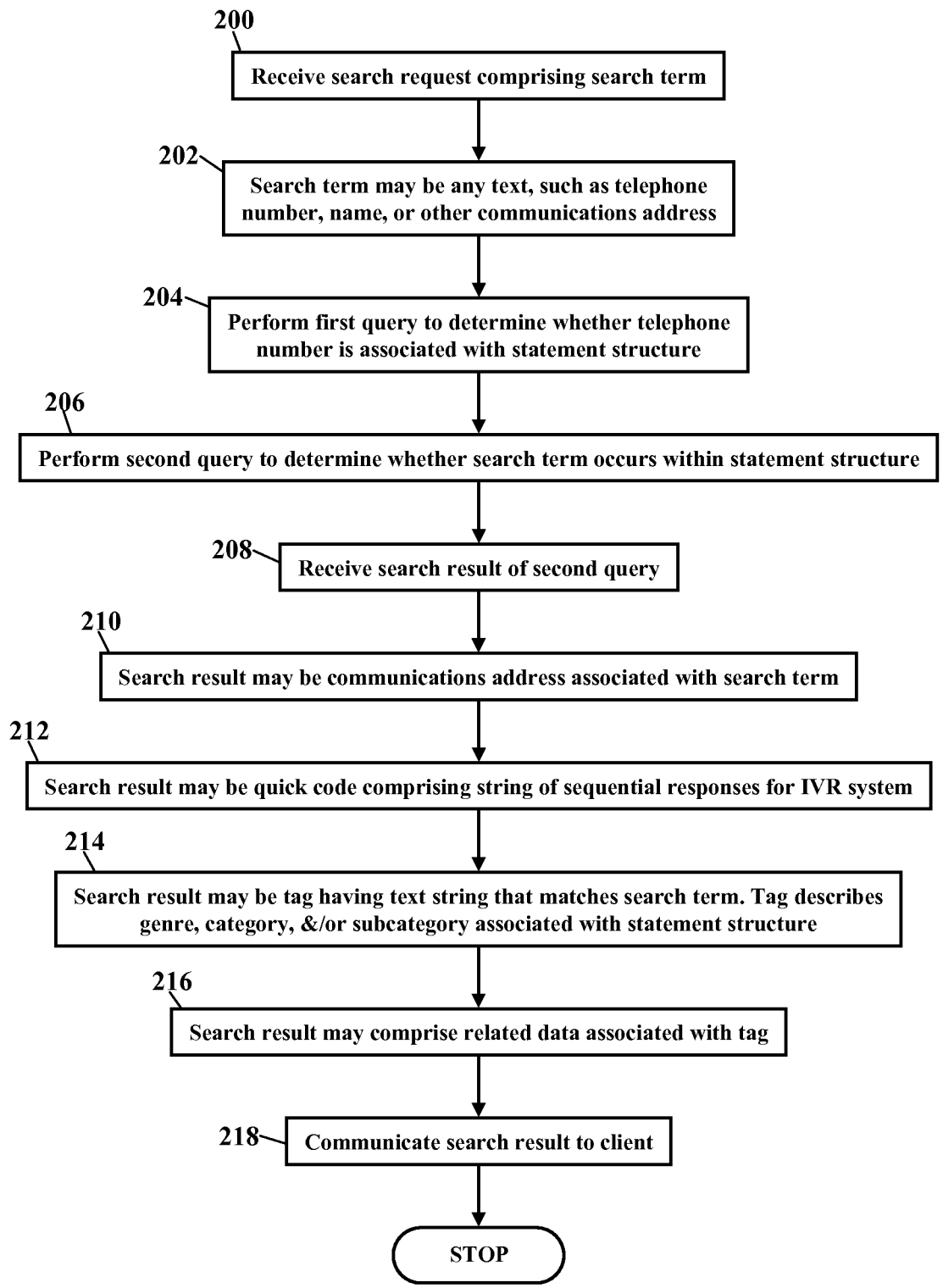

METHODS, SYSTEMS, AND PRODUCTS FOR SEARCHING INTERACTIVE MENU PROMPTING SYSTEMS

CROSS-REFERENCE TO RELATED APPLICATIONS

This application is a continuation of U.S. application Ser. No. 11/303,132, filed Dec. 16, 2005, now issued as U.S. Pat. No. 7,577,664, and incorporated herein by reference in its entirety.

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to interactive voice messaging systems and to messaging.

Prompting systems are very popular in today's communications environment. These prompting systems, such as an Interactive Voice Response (IVR) system, quickly direct a user to a particular department, extension, or information. These prompting systems, additionally, are an efficient and less expensive method of resolving customer inquiries. Although some users lament the loss of human operators, today's prompting systems provide generally satisfactory customer service at a lower cost.

While prompting systems offer advantages for both businesses and users, current prompting systems are not suited to the Internet environment. That is, the menu of prompts is not accessible to computer users. While an IVR system's menu of prompts may be convenient for callers, computer users could also benefit from having similar access to the menu of prompts. What is needed, then, is an IVR menu of prompts that can be accessed and searched via the World Wide Web.

SUMMARY

The aforementioned problems, and other problems, are reduced, according to the exemplary embodiments, using methods, systems, and products that allow searching of a searchable listing of an interactive menu prompting system. A searchable listing is the system's menu of prompts that has been formatted and/or converted into Internet-capable statements. That is, the interactive menu prompting system's menu of prompts is converted into statements that can be communicated across the World Wide Web. The searchable listing is a computer file that contains these Internet-capable statements. The searchable listing is stored on an accessible computer server, such that the searchable listing may be accessed, or "crawled," and stored in a YAHOO® or GOOGLE® database. The searchable listing, then, is made available for public querying or searching, as other webpage postings. A computer user, then, may search the searchable listing to find telephone numbers, addresses, and other related information contained within the interactive menu prompting system's menu of prompts. As the following paragraphs will explain, tags may also be added to enhance search capabilities, thus providing a more meaningful search result.

The exemplary embodiments describe a method for searching a searchable listing of an interactive menu prompting system. A search request is received, and the search request comprises a search term. A query is then sent to determine whether the search term occurs within in the searchable listing. A search result of the query is received and communicated to a client.

In another of the embodiments, a system is disclosed for searching a searchable listing of an interactive menu prompting system. The system comprises a query handler stored in memory, and a processor communicates with the memory. The processor receives a search request comprising a search term. The query handler issues a query to determine whether the search term occurs within in the searchable listing. The processor receives a search result of the query and communicates the search result to a client.

In yet another embodiment, a computer program product is also disclosed for searching a searchable listing of an interactive menu prompting system. The computer program product stores computer code for receiving a search request comprising a search term. A query is then sent to determine whether the search term occurs within in the searchable listing. A search result of the query is received and communicated to a client.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 17 is a flowchart illustrating a computer-implemented method for searching a searchable listing of an Interactive Voice Response (IVR) system.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products are disclosed that allow searching of a searchable listing. According to an embodiment, a searchable listing is an interactive menu prompting system's menu of prompts that has been formatted and/or converted into Internet-capable statements. That is, the interactive menu prompting system's menu of prompts is converted into statements that can be communicated across the World Wide Web. The searchable listing is a computer file that contains these Internet-capable statements. The searchable listing is stored on an accessible computer server, such that the searchable listing may be accessed, or "crawled," and stored in a database, such as a YAHOO® or GOOGLE® database. The searchable listing, then, is made available for public querying or searching, as other webpage postings. A computer user, then, may search the searchable listing to find telephone numbers, addresses, and other related information contained within the interactive menu prompting system's menu of prompts. Tags may also be added to enhance search capabilities, thus providing a more meaningful search result.

Figure 1:
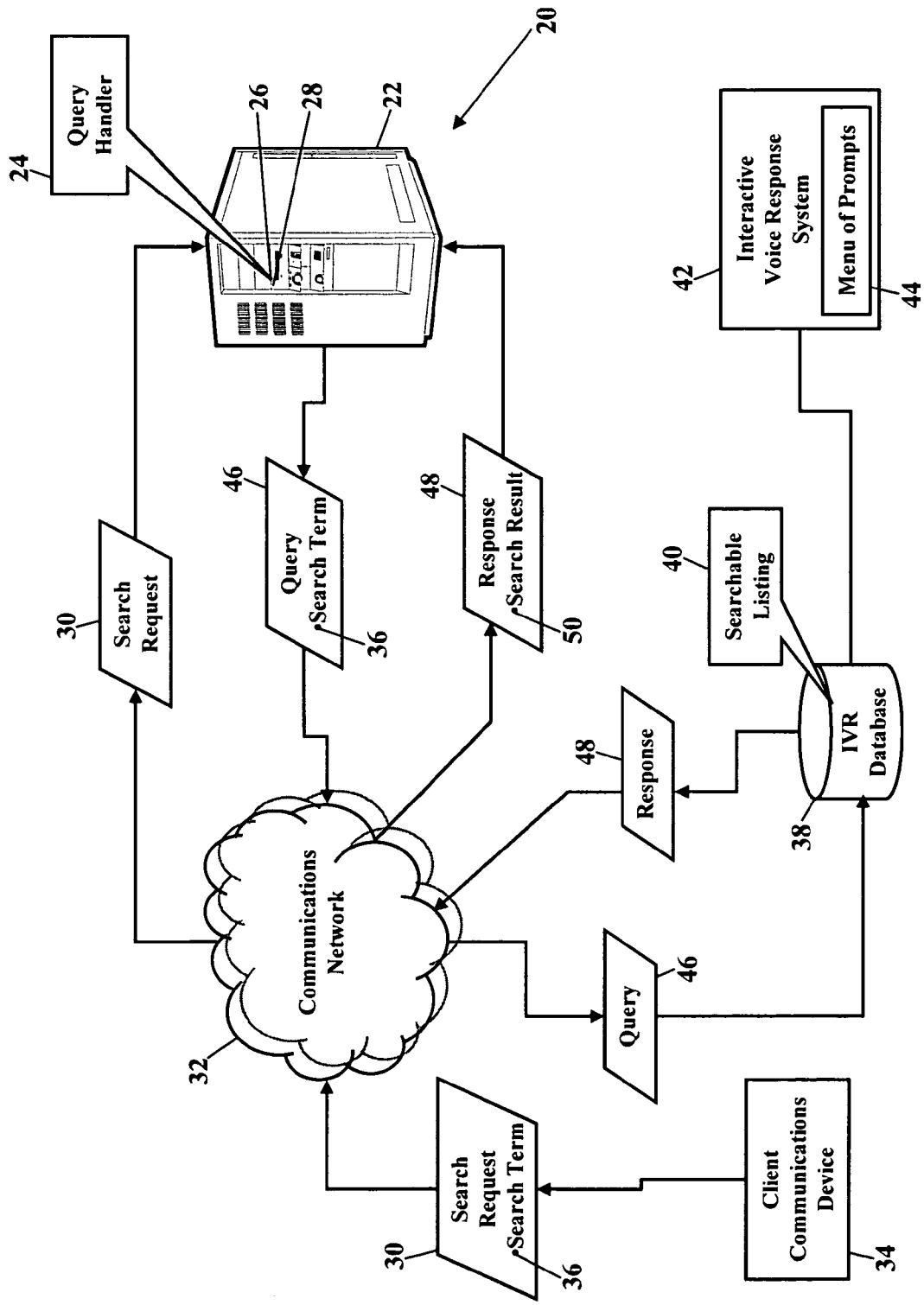
FIG. 1 is a schematic illustrating implementation of system for searching a hierarchical tree menu of an interactive menu prompting system, according to exemplary embodiments.

FIG. 1 is a schematic illustrating a system 20 for searching a hierarchical tree menu of an interactive menu prompting system, according to exemplary embodiments. The system 20 is illustrated as a computer 22, but the system 20 may be any processor-controlled device. A query handler 24 is stored in memory 26 of the computer 22, and a processor 28 communicates with the memory 26. The query handler 24 may be a software application that receives and processes database search requests. The query handler 24, for example, receives a search request 30 via a communications network 32. The search request 30 communicates from a client communications device 34. The search request 30 has a packetized structure according to a packet protocol, and the search request 30 comprises a search term 36.

The query handler 24 then queries an IVR database 38. The IVR database 38 contains references and archival copies of web pages and other online sources of IVR structures which have been tagged as having IVR source data information for a particular phone number. The IVR database 38 stores a searchable listing 40 of an Interactive Voice Response (IVR) system 42. The IVR database 38 may include an index to a point of origin for the searchable listing 40. As those of ordinary skill in the art understand, an IVR system presents a menu of prompts to a user, and the IVR system receives responses to those prompts. According to an exemplary embodiment, however, the IVR system 42 presents a menu 44 of prompts that is formatted for storage and retrieval as an online resource or accessible webpage. The searchable listing 40, then, represents this formatted and searchable menu 44 of prompts. That is, the IVR system's menu 44 of prompts is converted into statements that can be easily searched and communicated across any network. The menu 44 of prompts may be manually converted (perhaps by the recipient), or a software program (perhaps built into the query handler 24) may convert the menu of prompts into an active and/or passive set of readable data. The menu 44 of prompts, for example, may be formatted into an eXtensible Markup Language (XML) and stored in the IVR database 38. The menu 44 of prompts, for example, may be stored on a web site as a standalone page. The menu 44 of prompts may be accessed by clicking on a phone number which has an IVR icon (perhaps resembling a telephone keypad). The menu 44 of prompts could also be converted to Standardized Generalized Markup Language (SGML) statements and stored in a centralized online resource (e.g., the Yellow Pages) which would aggregate the information in one place. Any language, in fact, may be used to convert the IVR system's menu 44 of prompts into statements for transmission across the World Wide Web. Whatever the language, the searchable listing 40 is a file that contains these statements. The searchable listing 40 may then be queried and searched, as may be other webpage postings.

When the query handler 24 receives the packetized search request 30, the query handler 24 determines what is requested. The query handler 24 looks to see if IVR information or if a telephone number is being requested. If an IVR specific search is being requested, the query handler 24 issues a query 46. The query 46 contains the search term 36. The query handler 24 queries the IVR database 38 to determine if any listed searchable listing 40 contains the search term 36. If the IVR database 38 is remotely located from the computer 22, then the query handler 24 sends the packetized query 42 via the communications network 32. Whatever the physical location of the IVR database 38, the query handler 24 receives a packetized response 48. The packetized response 48 comprises a search result 50. The search result 50 describes all resources that contain the search term 36. The query handler 24 commonly return communicates the search result 50 to the client communications device 34 via the communications network 32. The query handler 24 may return communicate the search result 50 in any form, such as an abbreviated or verbose manner, by which the client may choose to expand or act on the returned information.

The query handler 24 may first inspect the packetized search request 30. The query handler 24 may inspect the search request 30 to see if IVR information or if a telephone number is being requested. If the query handler 24 determines that a telephone number (with or without an IVR request) is being submitted, the query handler 24 may query search other databases as well to return a complete set of numbers which do and/or do not contain IVR tree information. In the case where a telephone number search returns an information tag that the IVR data is also available, the IVR information may also be returned (perhaps appended to the search result), or made accessible by denoting that the search result (e.g., showing a telephony keypad icon) has IVR information that is available.

The exemplary embodiments are applicable to any interactive menu prompting system. Because most readers are assumed to be generally familiar with an Interactive Voice Response system, such system is mostly discussed herein. The exemplary embodiments, however, may be applied to any type of menu system, whether exposed by voice or by visual prompts. Any type of menu system, having a sequence of numerical choices that can be exposed for searching and speed entry, may utilize the exemplary embodiments. Additionally, any vendor's Interactive Voice Response application may be designed or revised to include the principles described herein. A conventional IVR system, however, need not facilitate creation of searchable IVR structures (such as the searchable listing 40). Facilitating and/or creating searchable IVR structures may be accomplished manually or by other semi-automated means outside of the conventional IVR system. In many instances, a standalone IVR translator may be used to convert existing structures that do not provide or are incapable of adding searchable functionality. Additionally, any menu of prompts may be converted and/or formatted into XML statements, SGML statements, or any other language for transmission across the World Wide Web or over a private network(s). Because Interactive Voice Response systems are well known to those of ordinary skill in the art, the operating principles and componentry of conventional IVR systems will not be further explained for brevity. If, however, the reader desires a further explanation, the reader is directed to the following sources, all incorporated herein by reference: U.S. Pat. No. 6,016,336 to Hanson (Jan. 18, 2000); U.S. Pat. No. 6,370,238 to Sansone et al. (Apr. 9, 2002); U.S. Pat. No. 6,456,619 to Sassin et al. (Sep. 24, 2002); U.S. Pat. No. 6,487,277 to Beyda et al. (Nov. 26, 2002); U.S. Pat. No. 6,885,733 to Pearson et al. (Apr. 26, 2005); U.S. Pat. No. 6,922,466 to Peterson et al. (Jul. 26, 2005); U.S. Pat. No. 5,455,853 to Cebulka et al. (Oct. 3, 1995); U.S. Pat. No. 6,104,790 to Narayanaswami (Aug. 15, 2000); U.S. Pat. No. 6,775,264 to Kurganov (Aug. 10, 2004); Published U.S. Patent Application 2003/0041314 to Heeren et al. (Feb. 27, 2003); Published U.S. Patent Application 2004/0042593 to Gulrajani et al. (Mar. 4, 2004); Published U.S. Patent Application 2004/0120479 to Creamer et al. (Jun. 24, 2004); Published U.S. Patent Application 2004/0153322 to Neuberger et al. (Aug. 5, 2004); Published U.S. Patent Application 2004/0205731 to Junkermann (Oct. 14, 2004); Published U.S. Patent Application 2005/0135338 to Chiu et al. (Jun. 23, 2005); and Published U.S. Patent Application 2005/0137875 to Kim et al. (Jun. 23, 2005).

Figure 2:
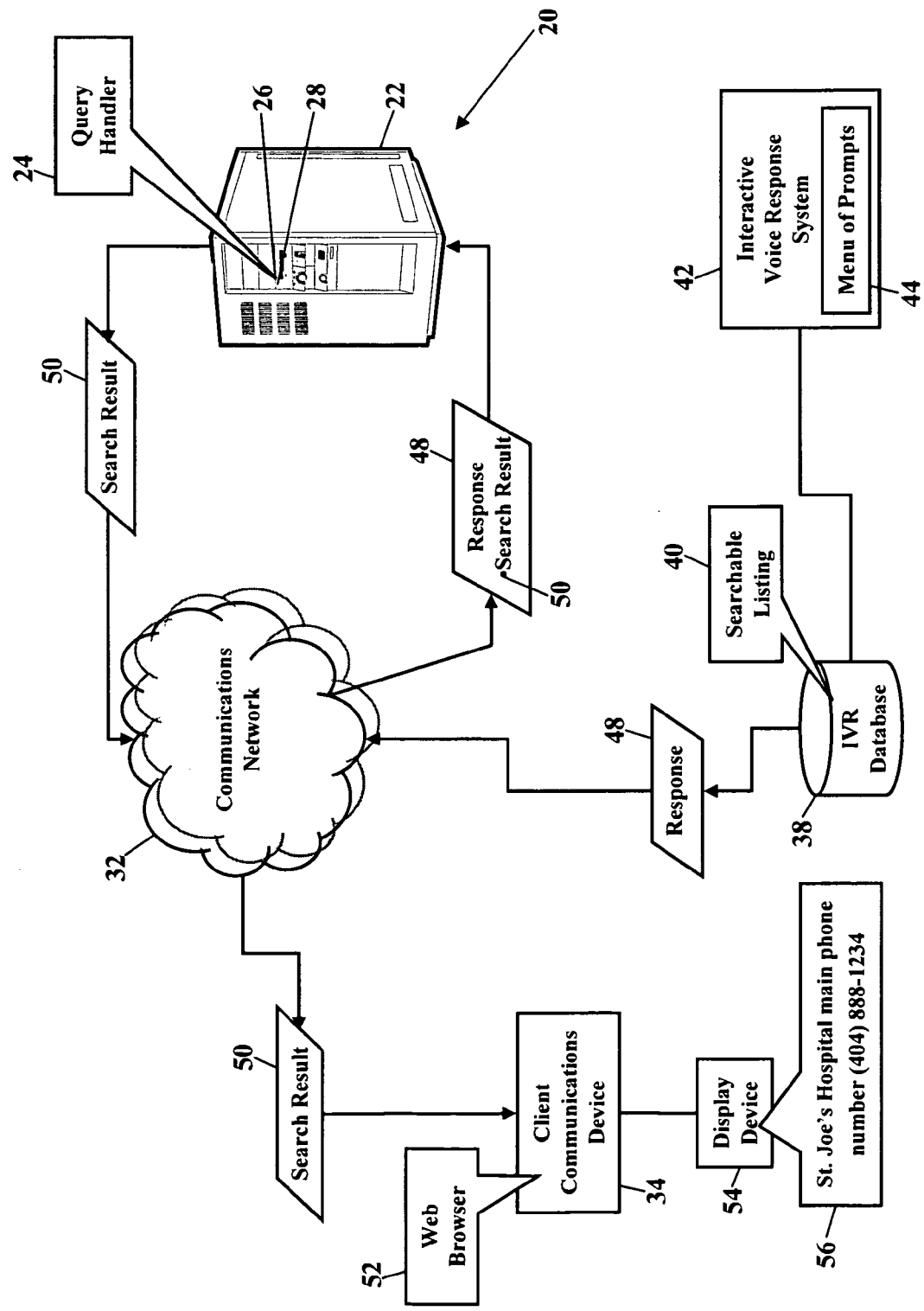
FIG. 2 is a schematic illustrating handling of a search result, according to more exemplary embodiments.

FIG. 2 is a schematic illustrating handling of the search result 50, according to more exemplary embodiments. After receiving the search result 50, the query handler 24 return communicates the search result 50 to the client communications device 34 via the communications network 32. When the client communications device 34 receives the packetized search result 50, a web browser 52 (or any other program) causes the client communications device 34 to visually and/or audibly process the search result 50. The client communications device 34 may visually present the search result 50 via a display device 54. The client communications device 34 may additionally or alternatively audibly present the search result 50 via an audio device (not shown for simplicity). FIG. 2, for example, illustrates the display device 54 displaying a branch portion 56 of the searchable listing 40. That is, the client communications device 34 displays a graphical portion of the IVR menu 44 of prompts that contains the search result 50. Remember, the IVR system's menu 44 of prompts was converted into Internet-capable statements and stored as the searchable listing 40. The search result 50, then, could include a graphical version of a portion or branch containing the search term (shown as reference numeral 36 in FIG. 1). A user of the client communications device 34, then, sees a graphical branch of the IVR system's menu 44 of prompts. The search result 50, then, is a "short cut" to the desired information contained with the IVR menu 44 of prompts.

Figure 3:
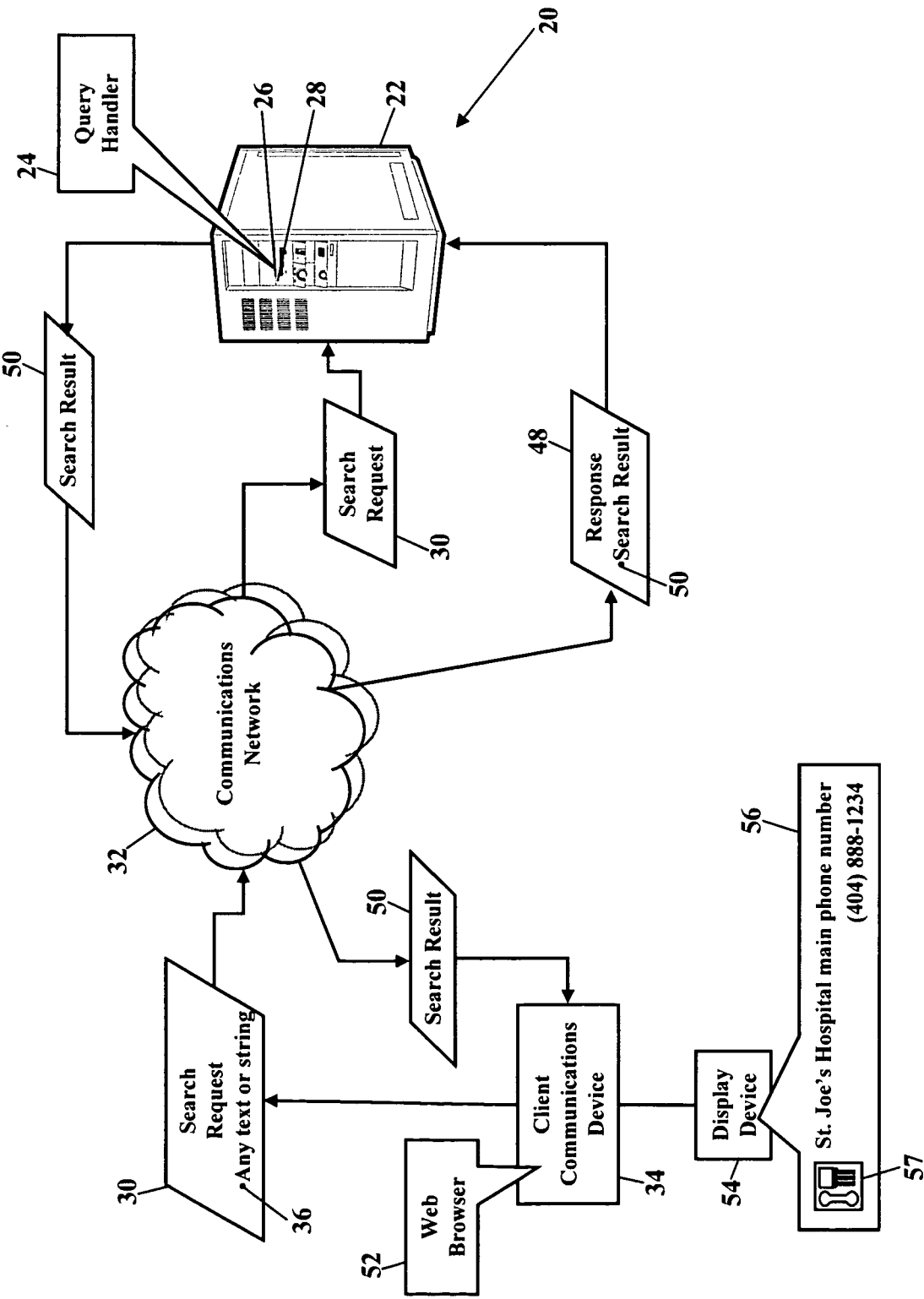
FIG. 3 is a schematic illustrating a generic search of an Interactive Voice Response (IVR) menu, according to more exemplary embodiments.

FIG. 3 is a schematic illustrating a generic search of an Interactive Voice Response (IVR) menu, according to more exemplary embodiments. When the query handler 24 receives the search request 30, the search request 30 may comprise any search term 36 that the user desires. FIG. 3, then, illustrates the search term 36 as any text or text string. While the search term 36 may commonly be a telephone number, the search term 36 may be any text or text string that the user desires. The user, for example, may issue a search for "St Joe's Outpatient Billing." The resulting search result 50 could be a telephone number and/or web page(s) that contains "St Joe's Outpatient Billing." The search result 50 may additionally or alternatively contain a marker or explicit data about an IVR tree associated with that search term 36. So, while the exemplary embodiments sometimes mention telephone number, the search term 36 may be any text or text string. The search result 50, then, may be any content or resource that matches the search term 36. When the client communications device 34 receives the search result 50, the client communications device 34 visually and/or audibly processes the search result 50. The client communications device 34 may also process an icon 57. The icon 57 is actionable in that the user may select the icon 57. The icon 57, upon selection, invokes some action, such as an auto-dialing application (as will be discussed with reference to FIGS. 14 & 15).

Figure 4:
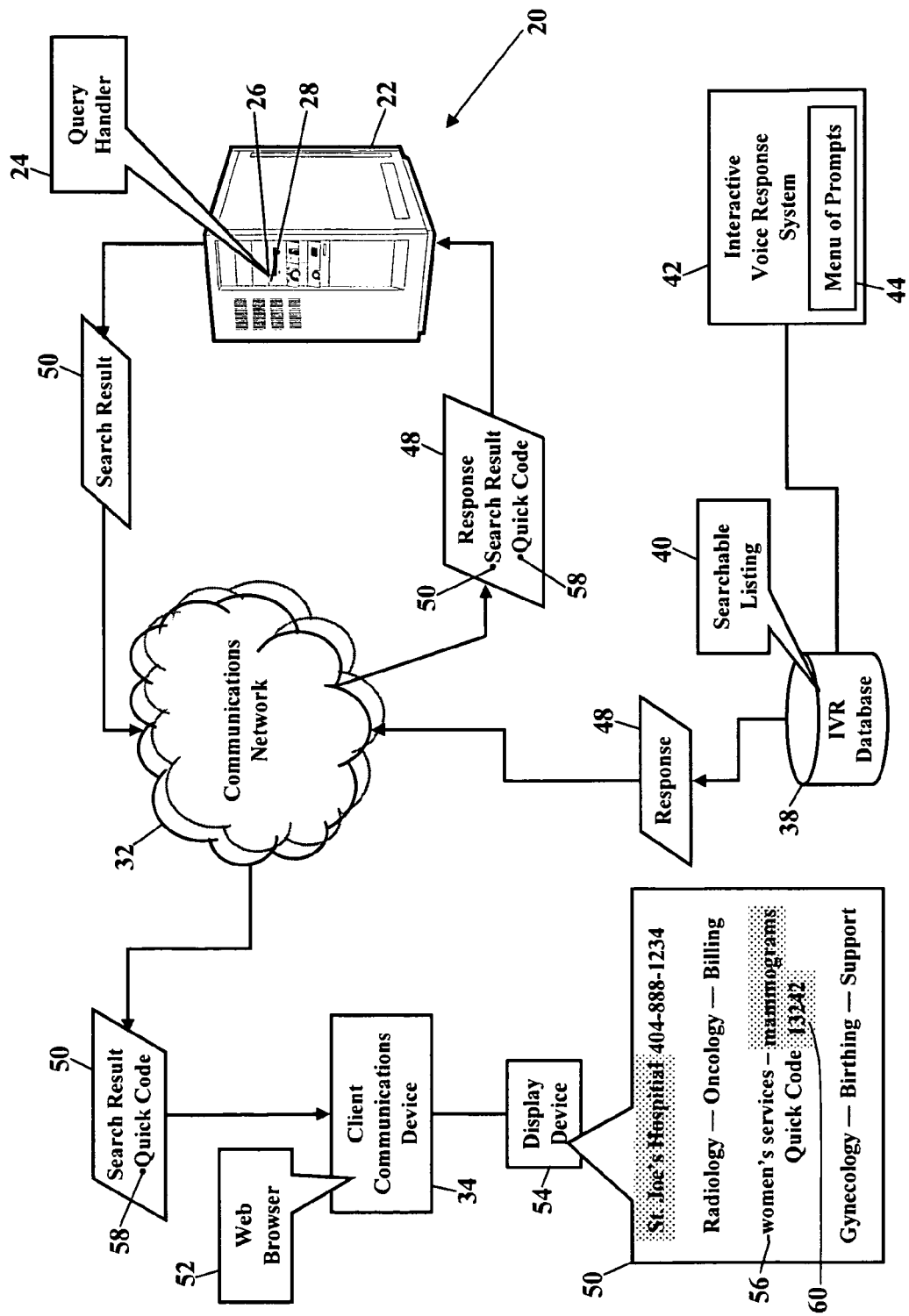
FIGS. 4 and 5 are schematics illustrating presentation of a quick dialing sequence, according to even more exemplary embodiments.

FIG. 4 is a schematic illustrating presentations of a quick dialing sequence, according to even more exemplary embodiments. When the query handler 24 receives the search result 50, the search result 50 may comprise a quick code 58. The quick code 58 is a string 60 of sequential responses for the IVR system. When the client communications device 34 receives and displays the search result 50, the user may then dial into the IVR system 42. Because the user has previously received the quick code 58, the user can input the quick code 58 and immediately navigate to a desired location within the IVR menu 44 of prompts. The user, for example, may input the quick code "1, 3, 2, 4, 2" and immediately reach a portion of the menu tree matching the search term (shown as reference numeral 36 in FIG. 1). The quick code 58 allows the user to immediately reach a desired department or extension, without listening to the entire menu 44 of prompts. The searchable listing 40, and the returned quick code 58, save time and make the IVR system 42 even easier to use.

FIG. 4 also illustrates conveniences for the user. When the client communications device 34 receives and displays the search result 50, the user is able to quickly and easily view the search result 50 (via the display device 54). The search result 50, for example, may include the branch portion 56 of the searchable listing 40. The branch portion 56 includes the search term (shown as reference numeral 36 in FIG. 1) and all the search results 50 matching the search term. FIG. 4, for example, illustrates highlighted search terms ("St. Joe's Hospital" and "mammograms") and the search results 50. Here the search results 50 include a telephone number of the hospital ("404-888-1234") and the quick code 58 ("13242"). Note the quick code 58 may be highlighted to match the search terms. The search result 50 may additionally include upper and/or lower tier levels within the searchable listing 40. The user may thus navigate through the searchable listing 40 (using cursor movement keys or commands) to select other portions of the IVR tree.

Figure 5:
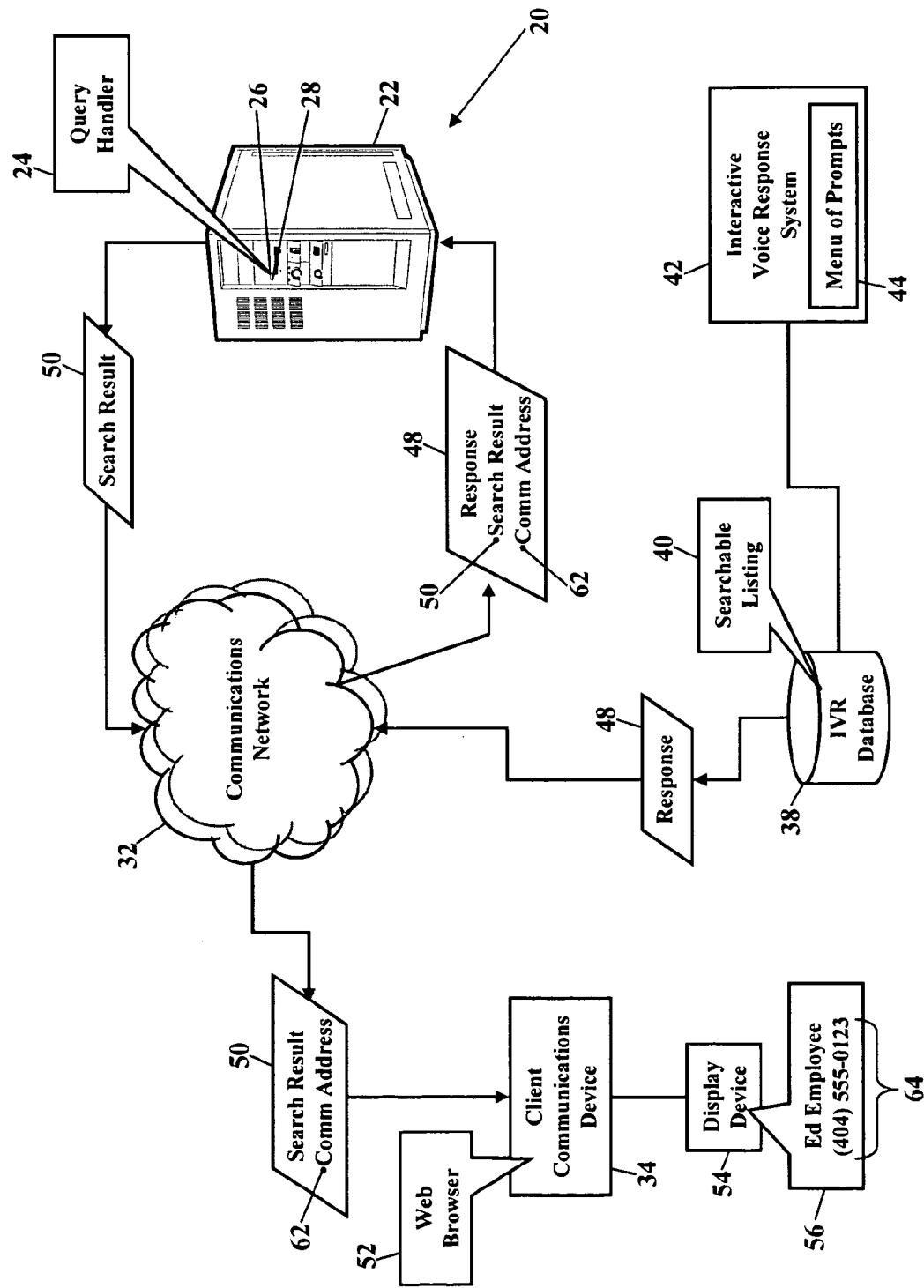

FIG. 5 is another schematic illustrating presentation of the search result 50, according to even more exemplary embodiments. Here the search result 50 includes a communications address 62. The communications address 62 may be a physical address, an email address, a telephone number, or other information, as will be explained. Suppose the search term (shown as reference numeral 36 in FIG. 1) is an employee name. The query handler 24 queries the IVR database 38 to determine whether the searchable listing 40 contains the employee name (as FIG. 1 and its accompanying text explained). When the IVR database 38 returns the search result 50, the IVR database 38 also returns the communications address 62 associated with that portion of the searchable listing 40 containing the employee name. The communications address 62, for example, could be a physical address, a telephone number, or an electronic address (e.g., an email address or IP address). If the returned communications address 62 is a telephone number 64, the user may then directly dial the retrieved telephone number to reach the employee. Similarly, if the search request (shown as reference numeral 30 in FIG. 1) did not specify an IVR look-up, the IVR database 38 may still be referenced, and results returned showing an icon next to the employee's name indicating that it was found in the searchable listing 40, and that the IVR information may also be shown.

Figure 6:
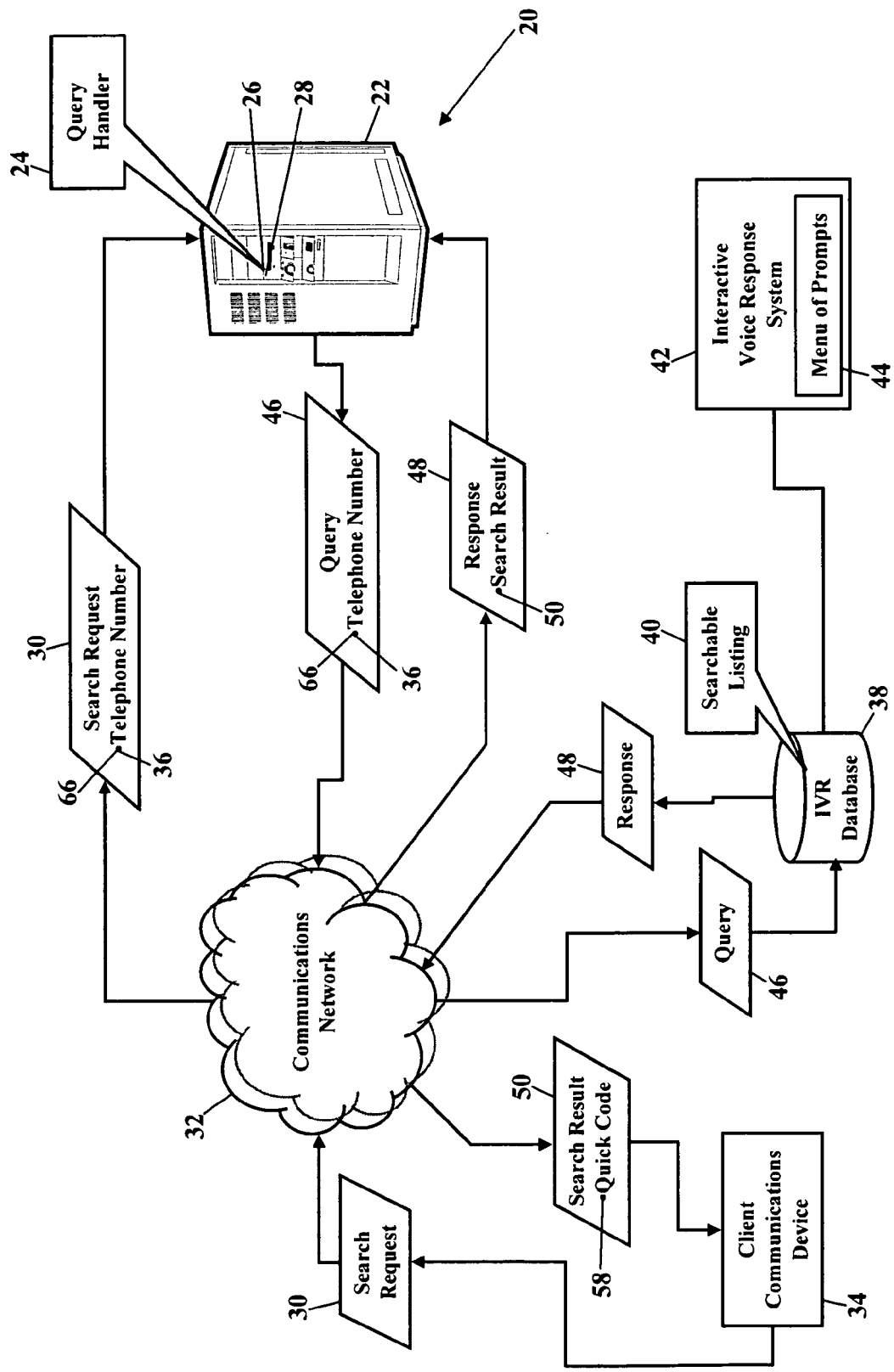
FIG. 6 is a schematic illustrating handling of a telephone number query, according to more exemplary embodiments.

FIG. 6 is a schematic illustrating a telephone number query, according to more exemplary embodiments. Here, when the query handler 24 receives the search request 30, the search term 36 is a telephone number 66. The query handler 24 then queries the IVR database 38 to determine if there are one or more searchable listings 40 referencing the telephone number 66. If the telephone number 66 is found, the query handler 24 return communicates the IVR structure associated with that telephone number, or the query handler 24 return communicates at least that branch portion containing the telephone number 66 within the IVR structure. The search result 50 may also include the quick code 58 to immediately reach an extension matching the telephone number 66 if additional data is entered.

The search result 50 need not be a branch portion. The search result 50 could include an entire graphical version of the IVR system's menu 44 of prompts. That is, if any portion of the searchable listing 40 contains the search term 36, then the query handler 24 may retrieve and return communicate the entire IVR menu tree. The searchable listing 40 is retrieved for display at the client communications device 34. Yet the IVR menu 44 of prompts can be large and unwieldy—a large organization may have a large searchable listing 40. Moreover, if the entire searchable listing 40 is returned to the client communications device 34, the user may find it challenging to navigate such a large tree. The search result 50, then, may only be a branch portion that matches the search term 36.

The search result 50 could include multiple results. If the search term 36 is not specific, the query handler 24 may find several branch portions of the searchable listing 40 that contain the search term 36. The search result 50 may then comprise those multiple results. The query handler 24, however, could prompt the user to refine the search. If the searchable listing 40 contains multiple branches that match the search term 36, the query handler 24 may return a message asking the user to refine the search term 36.

Figure 7:
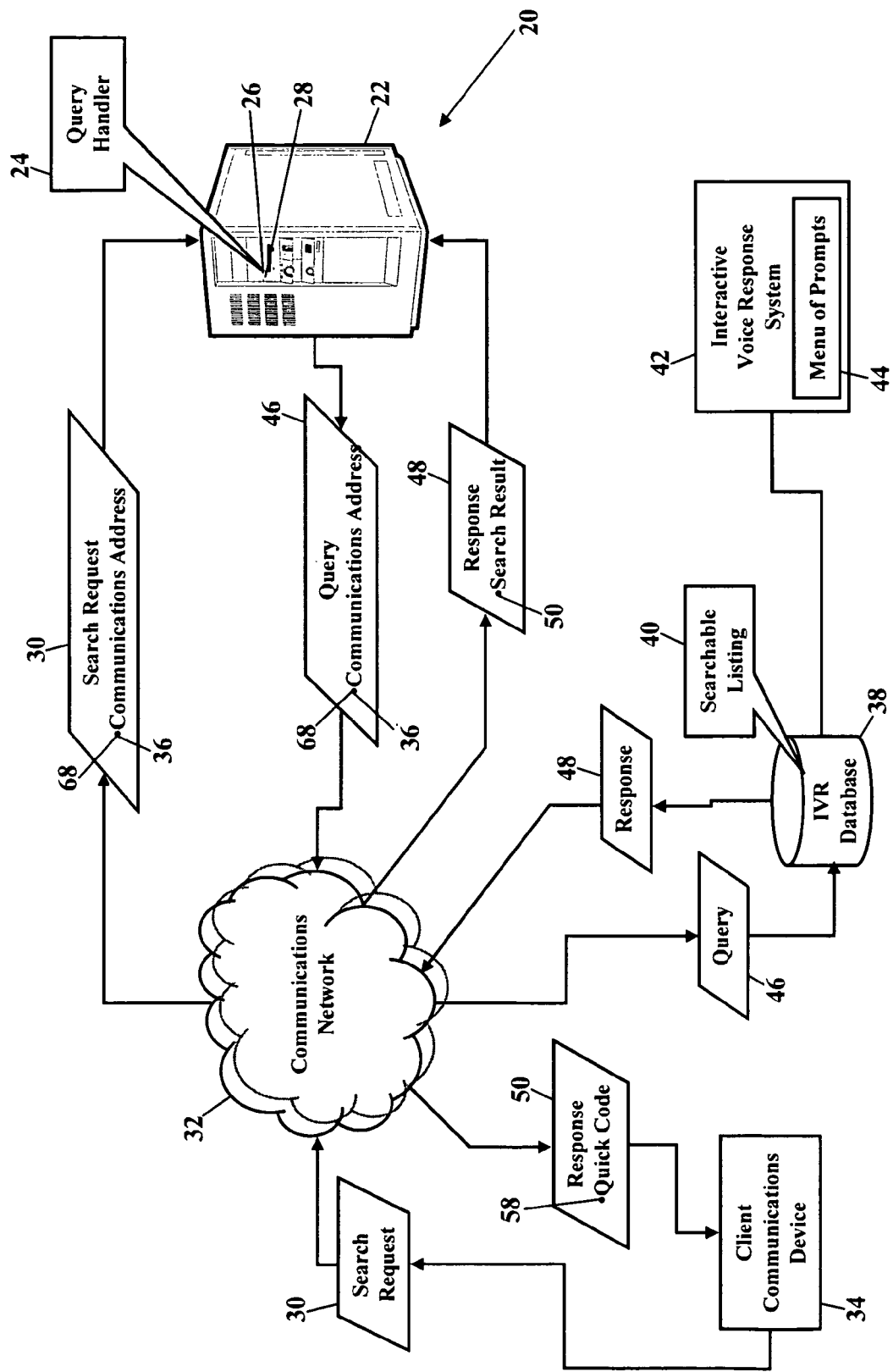
FIG. 7 is a schematic illustrating handling of a query for a communications address, according to exemplary embodiments.

FIG. 7 is a schematic illustrating a query for a communications address, according to exemplary embodiments. Here, when the query handler 24 receives the search request 30, the search term 36 is a communications address 68. The query handler 24 then queries the IVR database 38 to determine if the searchable listing 40 contains the communications address 68. The communications address 68 may be an email address, a pager address, an instant messaging address, or any Internet Protocol address. The communications address 68, however, may additionally or alternatively be a physical address, such as a number and street, city, state, country, and/or postal code. The communications address 68 may also include a building, department, floor, lab, supervisor, employee name and/or number, or any other identifying information. The communications address 68 may even include the telephone number (shown as reference numeral 66 in FIG. 6). If the communications address 68 is found, the query handler 24 return communicates at least that branch portion containing any information associated with the communications address 68. The query handler 24 return communications the search result 50 to the client communications device 34. The search result 50 may again include the quick code 58 to immediately reach a person or party at the communications address 68.

Figure 8:
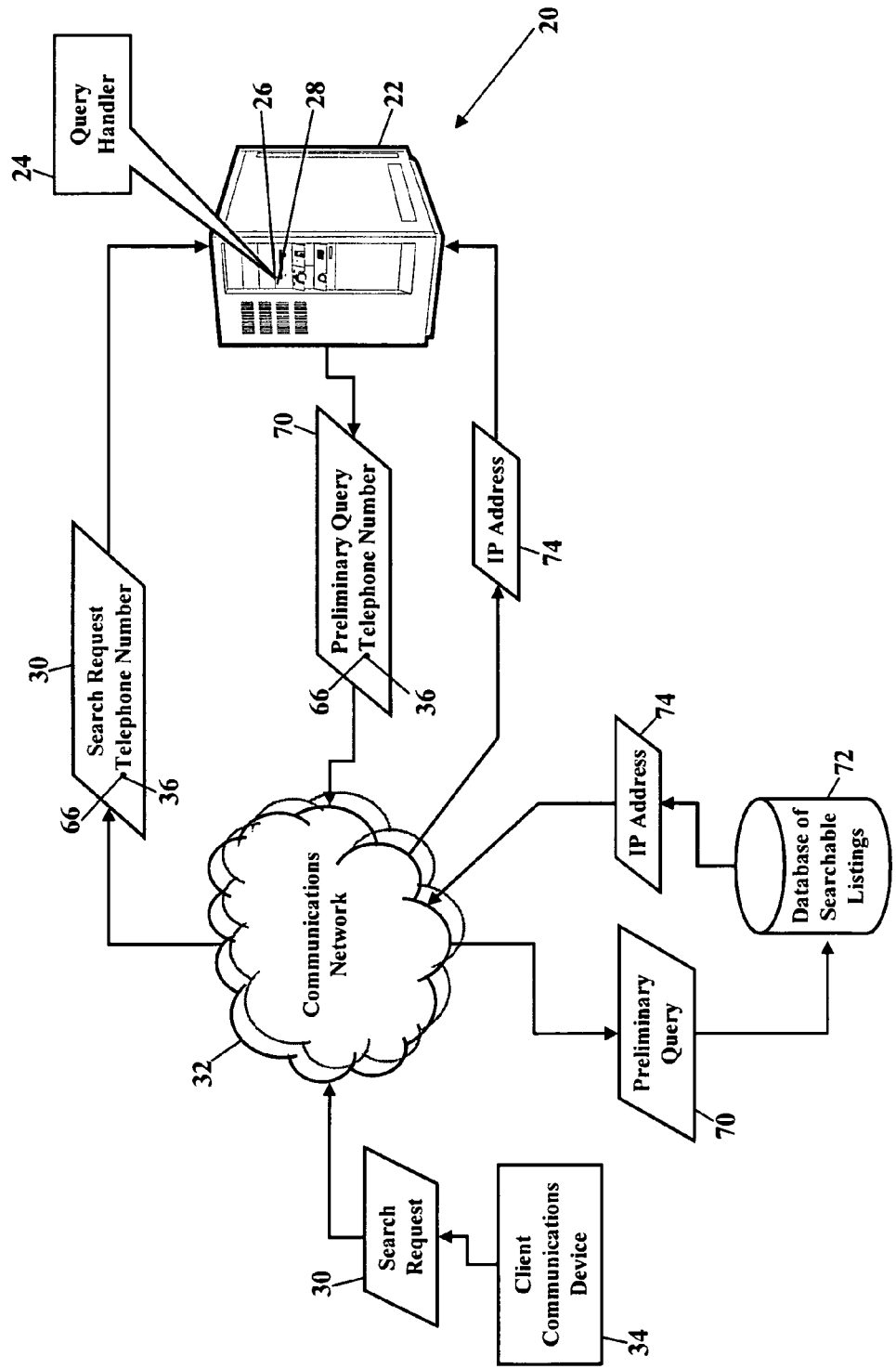
FIGS. 8 and 9 are schematics illustrating a preliminary query, according to still more exemplary embodiments.
Figure 9:
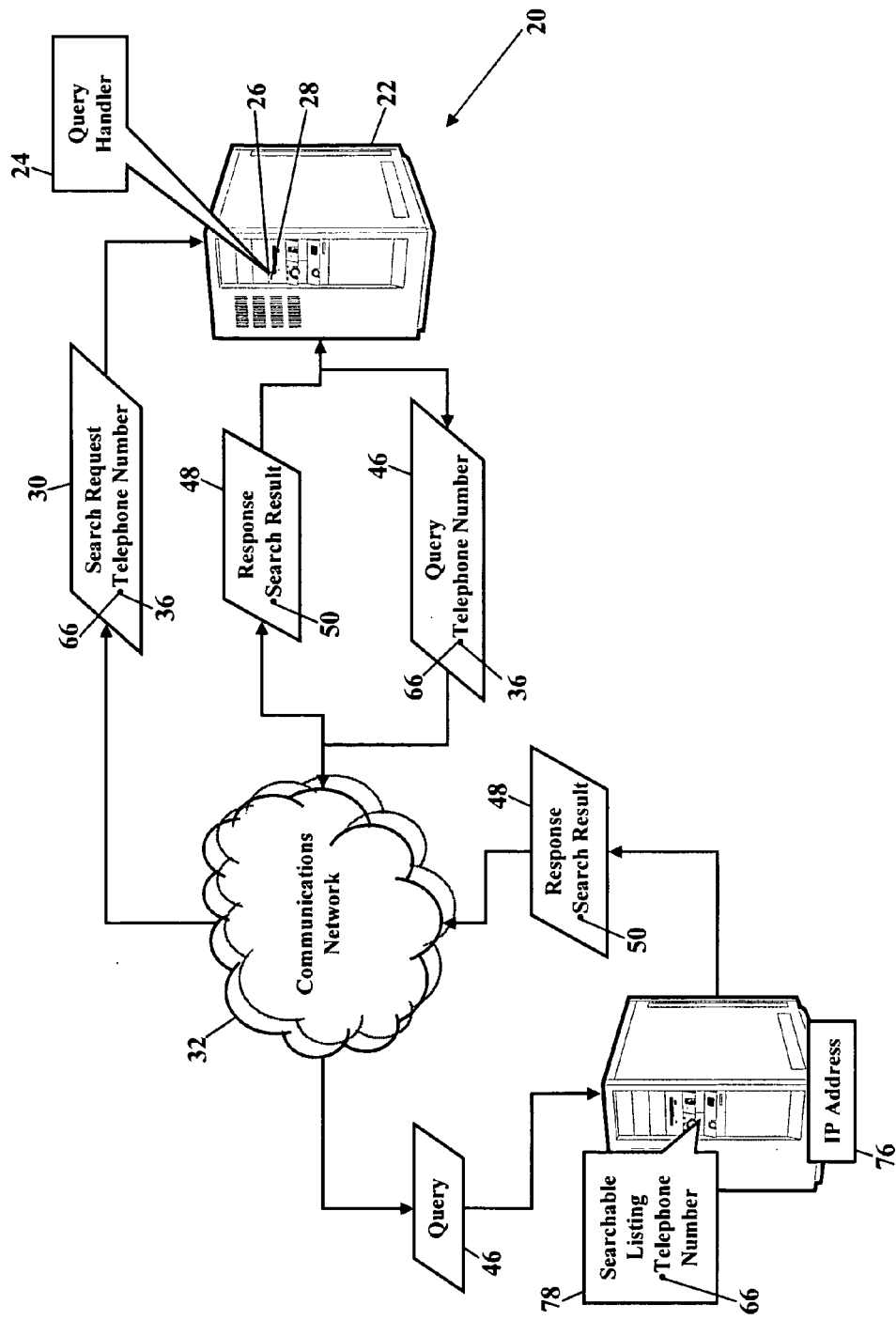

FIGS. 8 and 9 are schematics illustrating a preliminary query, according to still more exemplary embodiments. When the query handler 24 receives the search request 30, the search term 36 may again include the telephone number 66. Here, however, the query handler 24 first performs a preliminary query to determine whether the telephone number 66 is associated with one or more searchable listings. Because many IVR systems may have their respective menu of prompts converted into Internet-capable statements, the query handler 24 may have access to many different searchable listings. Suppose, for example, BELLSOUTH®, GENERAL ELECTRIC®, MICROSOFT®, and numerous other corporations and businesses have converted their IVR menu into Internet statements. These businesses then post their searchable listings on the World Wide Web. The query handler 24, then, must first choose which searchable listing to query for the search term 36.

Here, then, the query handler 24 performs a preliminary query. When the query handler 24 receives the search request 30 with the telephone number 66, the query handler 24 sends a preliminary query 70 to a database 72 of searchable listings. The preliminary query 70 communications via the communications network 32. The database 72 of searchable listings maps telephone numbers to searchable listings. The database 72 of searchable listings determines which of two or more accessible searchable listings contains the telephone number 66. The database 72 of searchable listings may represent a directory service (such as www.yellowpages.com). If the database 72 of searchable listings contains the telephone number 66, the database 72 of searchable listings returns an Internet Protocol address for the server storing the searchable listing associated with that telephone number 66. This server stores a person's, company's, or other entity's statement structures. If the telephone number 66, for example, is associated with the BellSouth's posted searchable listing, then the database 72 of searchable listings returns the IP address for the server storing BellSouth's searchable listing. If the database 72 of searchable listings contains the telephone number 66, the database 72 of searchable listings returns an Internet Protocol address 74. This Internet Protocol address may then be used to initiate a VoIP call directly to that person or department, from the client communications device 34.

FIG. 9, then, illustrates a query for directory service(s). When the query handler 24 receives the Internet Protocol address 74, the Internet Protocol address 74 identifies the address of a server 76. The server 76 stores a searchable listing 78 associated with the telephone number 66. The query handler 24 then sends the query 46 to the Internet Protocol address 74 associated with the server 76. The query 46 contains the telephone number 66 and communicates via the communications network 32. The server 76 receives the query 46 and accesses the searchable listing 78 associated with the telephone number 66. The server 76 then retrieves from the searchable listing 78 any information associated with the telephone number 66. The server 78, for example, could retrieve an employee name associated with the telephone number 66. Whatever the server 78 retrieves, the server 78 return communicates the packetized response 48 comprising the search result 50. The search result 50 describes any information associated with the telephone number 66. The query handler 24 may then communicate the search result 50 to the requesting application or directory service (not shown) being accessed through the client communications device 34, with the result displayed within that application as appropriate.

The preliminary query may involve other parameters. When the query handler 24 receives the search request 30, the query handler 24 may query the database 72 of searchable listings for any portion or term in the search term 36. The database 72 of searchable listings maps the search term 36 to searchable listings. The database 72 of searchable listings determines which of two or more accessible searchable listings contains the search term 36. If the database 72 of searchable listings contains the search term 36, then the database 72 of searchable listings again returns the Internet Protocol address 74. This Internet Protocol address 74 identifies the server storing the searchable listing associated with the search term 36.

Figure 10:
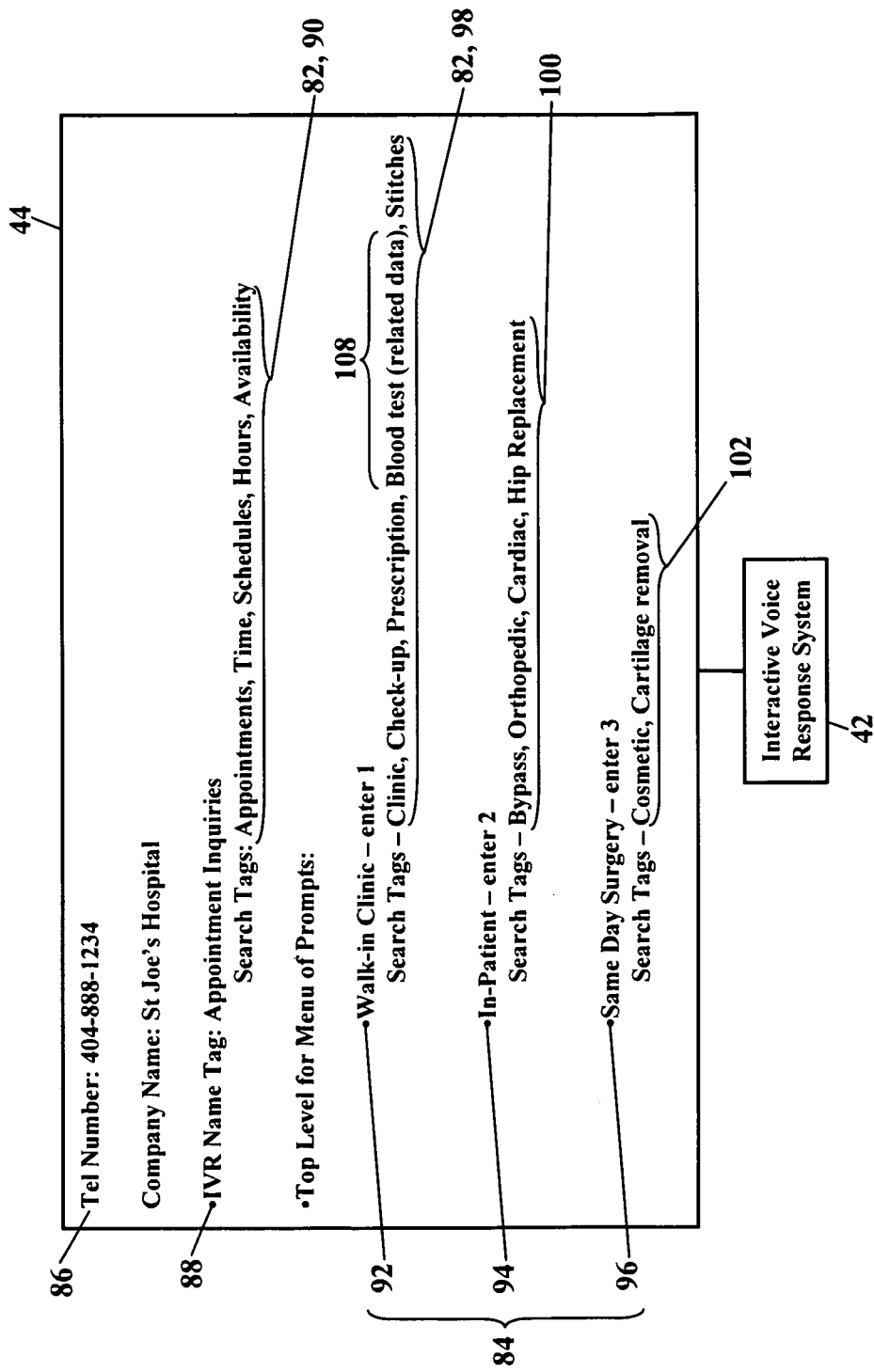
FIGS. 10-13 are schematics illustrating handling of tags, according to more exemplary embodiments.
Figure 11:
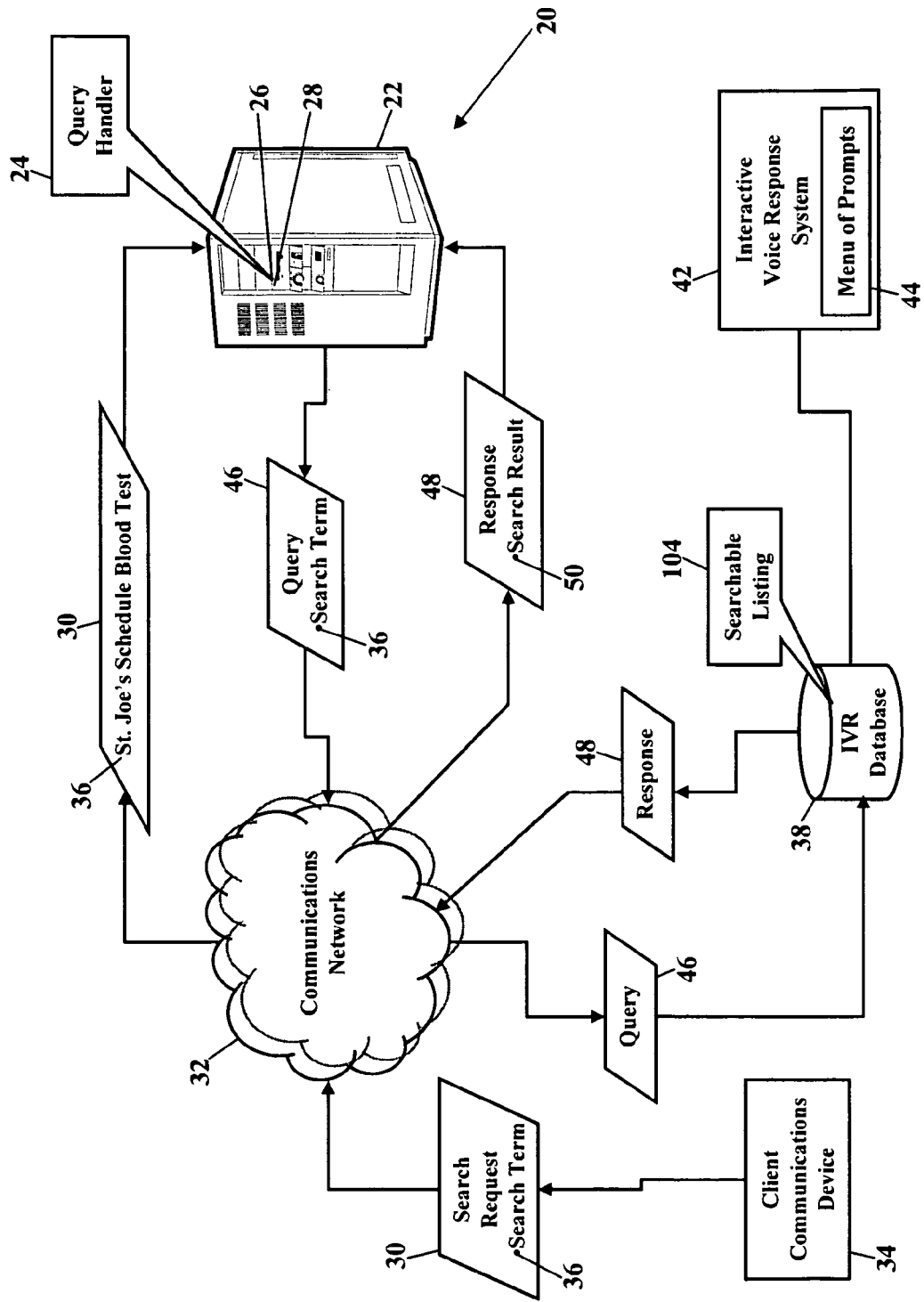
Figure 12:
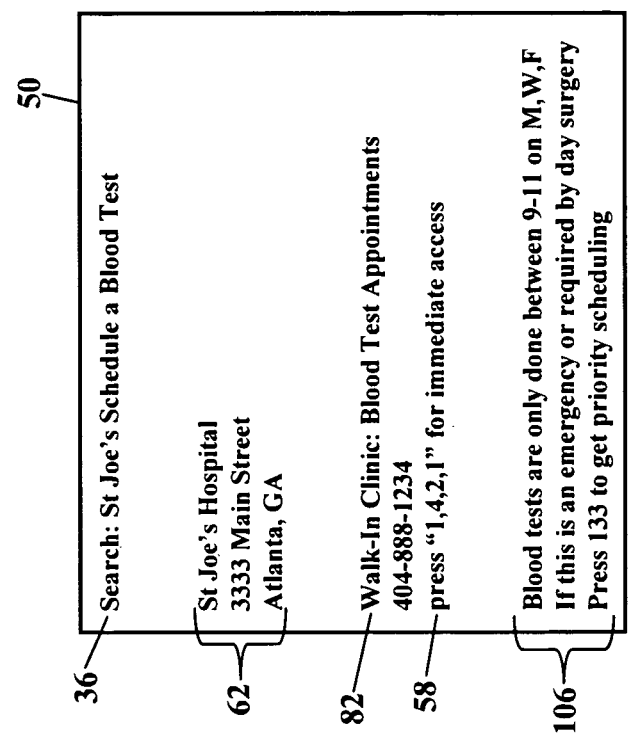
Figure 13:
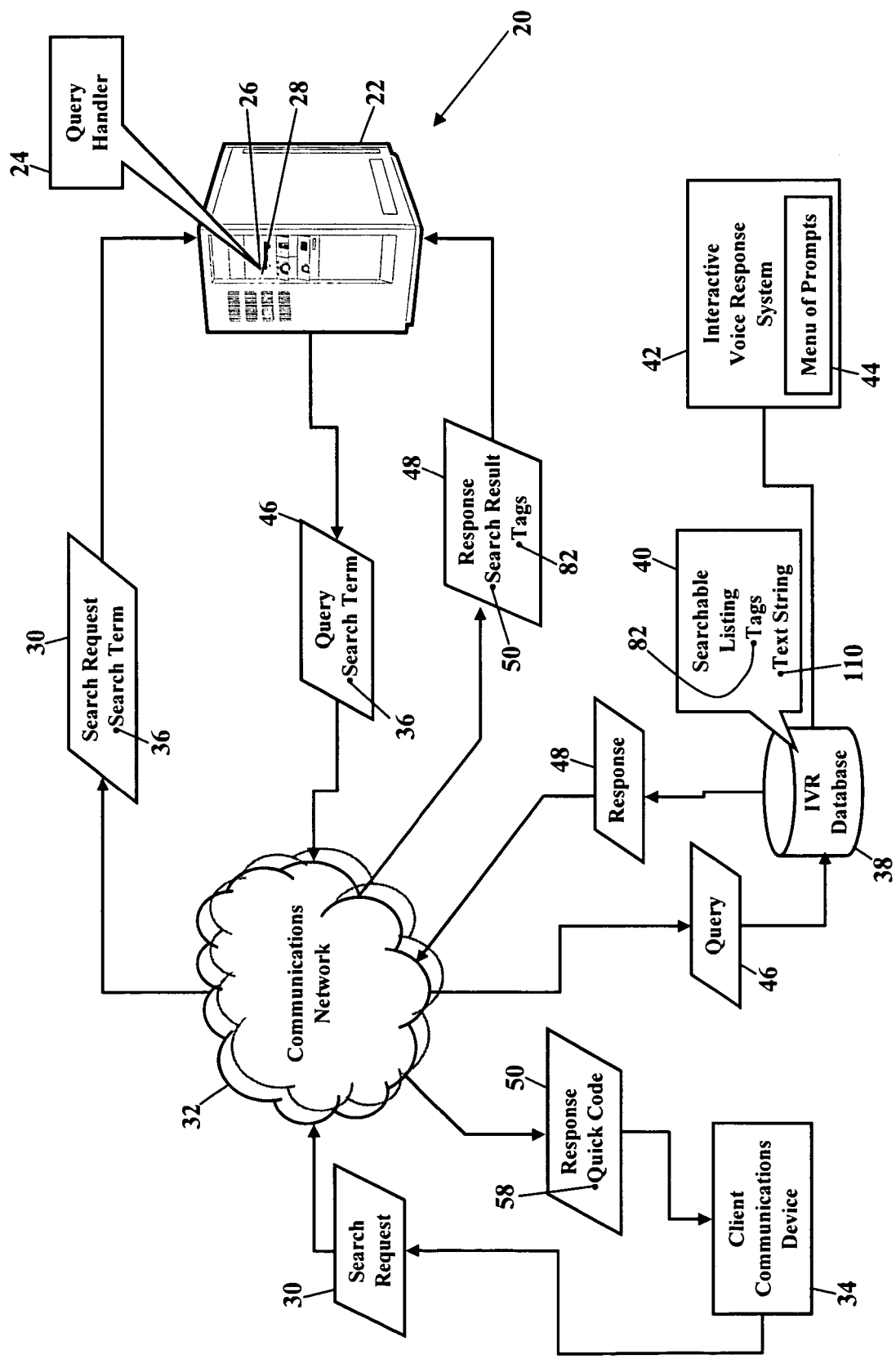

FIGS. 10-13 are schematics illustrating tags, according to more exemplary embodiments. FIG. 10 illustrates a portion of the menu 44 of prompts, while FIGS. 11-13 illustrate a tag 80 as the search result 50. FIG. 10 illustrates the menu 44 of prompts presented by the IVR system 42. The menu 44 of prompts includes one or more descriptive tags 82. These tags 82 describe a genre, a category, and/or a subcategory associated with a branch portion 84. When the menu 44 of prompts gets formatted and/or converted into searchable statements, those statements include any descriptive tags associated with the branched tree structure. Each tag is associated with a text string, and the text string may be searched. These tags may include such things as IVR category, Sub menu descriptor, Availability, Data Required before contact, Web site equivalent location (for info only IVR entries), on-line chat link, and any other information.

An example helps explain tags. Suppose a fictitious "St. Joe's Hospital" uses an Interactive Voice Response system to greet callers. A portion of the hospital's IVR menu 44 of prompts is illustrated in FIG. 10. The telephone number "404-888-1234" (shown as reference numeral 86) connects to the hospital's IVR system for appointment inquiries. The IVR system thus has a name tag 88 of "Appointment Inquiries." The name tag 88 is also associated with one or more search tags 90. These search tags are listed as "Appointments," "Time," "Schedules," "Hours," and "Availability." When St. Joe's Hospital converts this IVR menu 44 of prompts into its corresponding searchable listing, the tags 82 are added to the statements to enable a more meaningful search.

Tags may also be added to branches of the menu 44 of prompts. As FIG. 10 also illustrates, suppose the hospital's IVR menu 44 of prompts includes a first branch 92 "Walk-In Clinic," a second branch 94 "In-Patient," and a third branch 96 "Same Day Surgery." Each of these branches also has its associated search tags. The first branch 92 "Walk-In Clinic" has a first grouping 98 of associated search tags. The second branch 94 and the third 96 branch include their respective groupings 100 and 102 of associated search tags.

FIG. 11, then, illustrates St. Joe's corresponding searchable listing 104. The hospital's IVR menu 44 of prompts is then formatted and/or converted to their searchable listing 104 (e.g., XML, SGML, or other Internet-capable statements) and stored at the IVR database 38. Now, suppose the user at the client communications device 34 wants to perform a search for "St. Joe's Schedule Blood Test." The client communications device 34 sends the search request 30. When the query handler 24 receives the search request 30, the search term 36 is "St. Joe's Schedule Blood Test." The query handler 24 then queries the IVR database 38 for the search term 36. The returned search result 50 comprises any information associated with the search term 36 (e.g., "St. Joe's Schedule Blood Test").

FIG. 12 illustrates the search result 50. Here, the tags 82 provide a richer search result. Because St. Joe's converted searchable listing 104 includes the search tags 82, the search result 50 has meaningful content. The search result 50, for example, could include the communications address 62 (such as a street address and a telephone number) associated with the search term "St. Joe's Schedule Blood Test." Because the searchable listing (shown as reference numeral 104 in FIG. 11) includes the search tags 82, a better match can be found from the search tags "Walk-In Clinic," and "Blood Tests," and "Appointments." The query handler 24, then, is able to return a more meaningful search result to the search term 36. The search result 50 may even include the quick code 58 for directly dialing the clinic.

The search results 50 may include related data 106. Any tag 82 may include related data 106 associated with the tag. Suppose the search tag "Blood Tests" (shown as reference numeral 108 in FIG. 10) has associated data describing procedures for obtaining a blood test. FIG. 12, for example, illustrates some related data 106 that describes the hours for blood tests and a notice for priority scheduling. Each tag 82, in fact, may have any type and amount of related data that more clearly describes the associated tag.

FIG. 13, then, is a schematic illustrating the retrieval of tags and related data, according to exemplary embodiments. The client communications device 34 sends the search request 30 to the query handler 24. The search request 30 includes the search term 36. The query handler 24 then queries the IVR database 38 for the search term 36. The IVR database 38 retrieves any information associated with the search term 36 and with the search tags 82. The returned search result 50 includes this related information. The search result 50, for example, may include one or more of the tags 82. These tags 82 describe a genre, a category, and/or a subcategory associated with a branch portion of the searchable listing 40. Each tag 82 is associated with a text string 110, and the text string 110 may be searched and retrieved.

Figure 14:
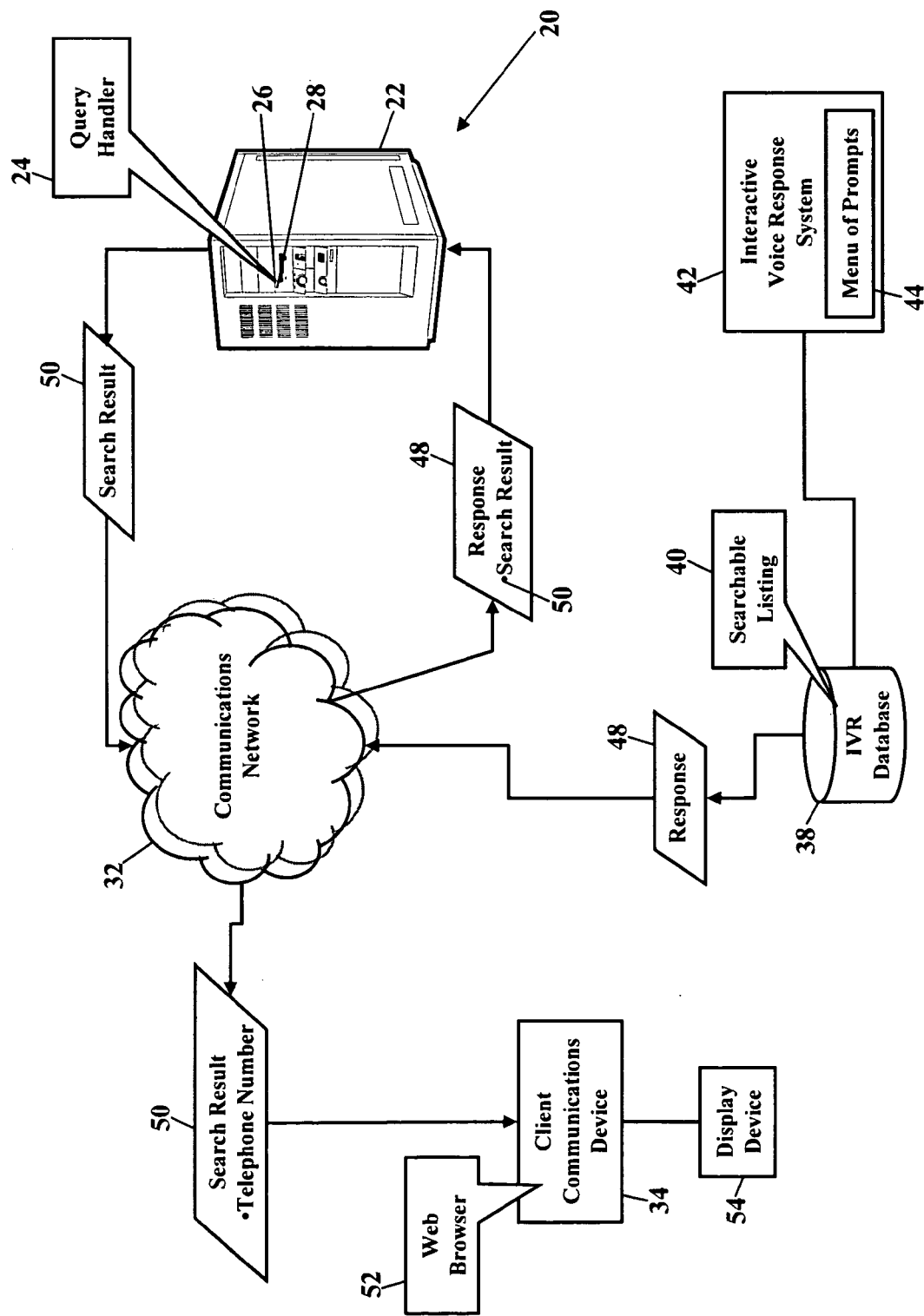
FIGS. 14 and 15 are schematics illustrating auto-dialing of a telephone number, according to still more exemplary embodiments.
Figure 15:
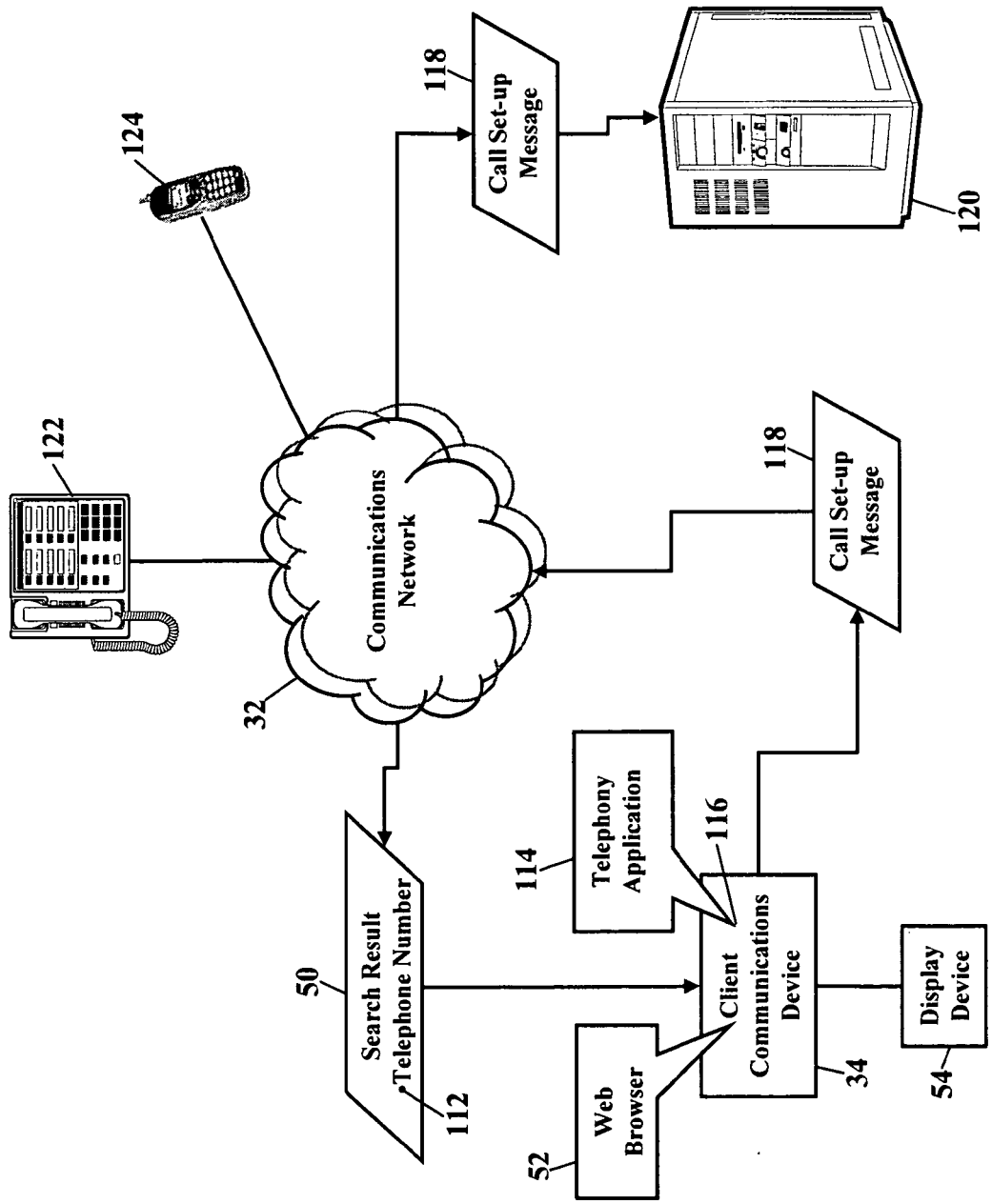

FIGS. 14 and 15 are schematics illustrating auto-dialing of a telephone number, according to still more exemplary embodiments. FIG. 14 is similar to FIGS. 1 and 2, so the common portions will only be briefly described. When the user at the client communications device 34 issues the search request (shown as reference numeral 30 in FIGS. 1 & 6-8), the search request communicates to the query handler 24 via the communications network 32. The search request includes the search term (shown as reference numeral 36 in FIGS. 1 & 6-9). The query handler 24 sends the query (shown as reference numeral 42 in FIGS. 1, 6, & 9) to determine if any searchable listing 40 contains the search term. The query handler 24 receives the response 48 including the search result 50. The query handler 24 then return communicates the search result 50 to the client communications device 34 via the communications network 32.

FIG. 15 illustrates a "click to dial" feature. That is, the client communications device 34 may include click-to-dial capability. When the client communications device 34 receives the search result 50, the web browser 52 (or any other program) may cause the client communications device 34 to visually and/or audibly process the search result 50. If the search result 50 includes a telephone number 112, the web browser 52 or other search application (not shown) could call or invoke a telephony application 114 stored in memory 116. If, for example, the client communications device 34 has Voice-over Internet Protocol (VoIP) capability, the user could "point and click" or otherwise select the telephone number 112. The telephony application 114 would then establish a VoIP call to the telephone number 112. If VoIP was not available, the telephony application 114 could send a call set-up data message 118 to a communications server 120. The call set-up data message 118 would instruct the communications server 120 to alert an auxiliary communications device, such as a POTS telephone 122, a cellular telephone 124, or any other communications device for an auto-dialing sequence. Those of ordinary skill in the art are aware of many methods by which to begin an auto-dialing sequence to a PBX, Soft Phone, etc.

Figure 16:
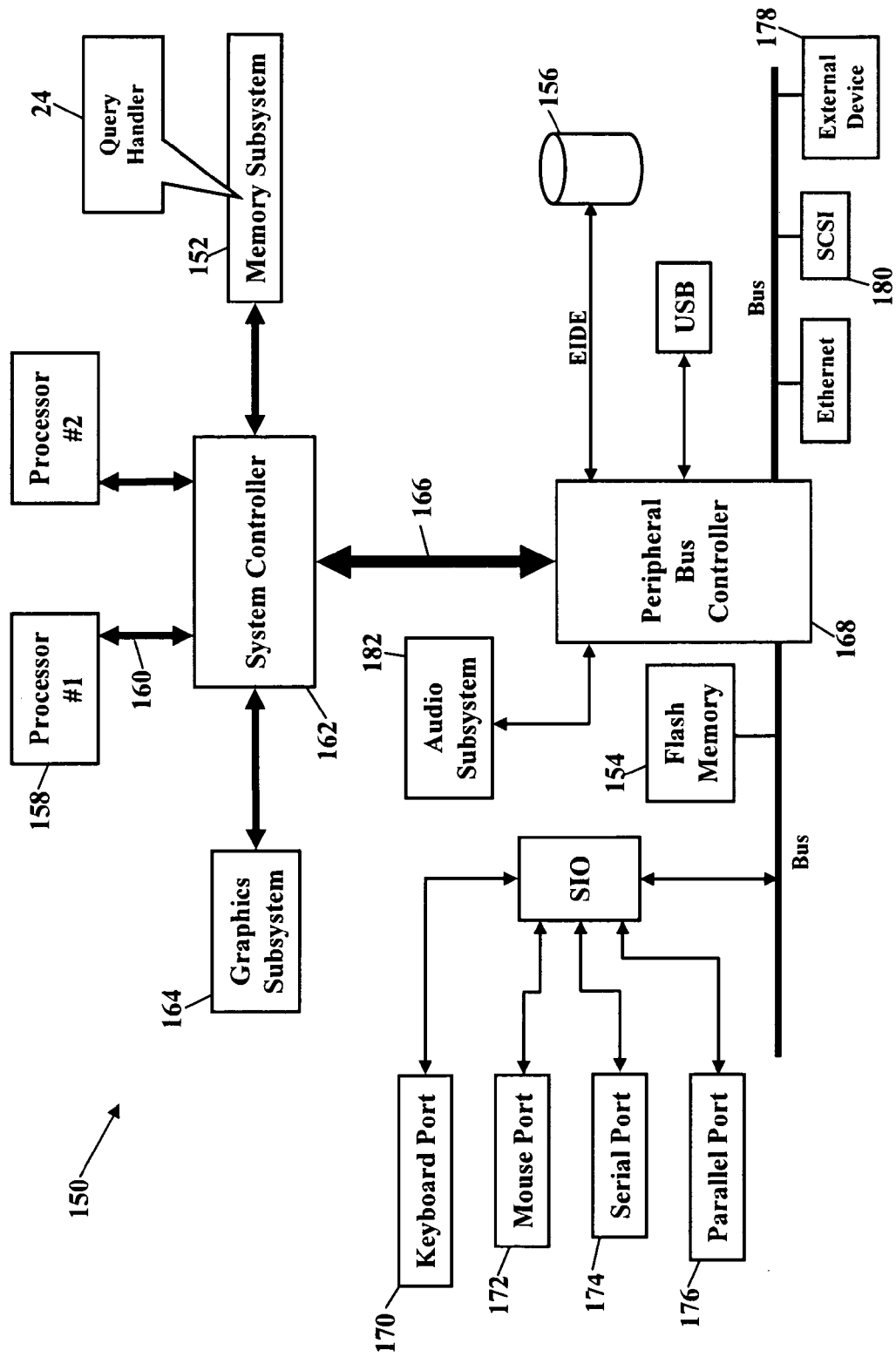
FIG. 16 depicts a possible operating environment for exemplary embodiments.

FIG. 16 depicts a possible operating environment for exemplary embodiments. FIG. 16 is a block diagram showing the query handler 24 residing in a processor-controlled system 150 (such as the computer 22 shown in FIGS. 1-14). FIG. 16, however, may also represent a block diagram of any computer or communications device in which the query handler 24 may operate. The query handler 24 operates within a system memory device. The query handler 24, for example, is shown residing in a memory subsystem 152. The query handler 24, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the computer system 150.

Any packet protocol is suitable. Exemplary embodiments describe the search request 30 and the response 44 as having a packetized structure. As those of ordinary skill in the art understand, sometimes computer information is packetized (or "framed") for use in packet networks. The computer information is grouped into packets according to a packet protocol. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Because many networks are "mixed"—that is, the network receives and handles packets of differing protocols, a "translator" determines the particular packet protocol and the appropriate destination for each packet. Because the basics of packetizing and packet protocols are well-known, this patent will not further explain packetizing and their protocols.

The exemplary embodiments may be applied regardless of networking environment. The communications network 32 may be a cable network operating in the radio-frequency domain and/or the Internet Protocol (IP) domain. The communications network 32 may have POTS components and/or features. The communications network 32, however, may also include a distributed computing network, such as the Internet (sometimes alternatively known as the "World Wide Web"), an intranet, a local-area network (LAN), and/or a wide-area network (WAN). The communications network 32 may include coaxial cables, copper wires, fiber optic lines, and/or hybrid-coaxial lines. The communications network 32 may even include broadband over power line portions and/or wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Exemplary embodiments also include publicly posting a searchable searchable listing. As the above paragraphs explained, some entities (such as businesses and corporations) may wish to store their searchable listing to a publicly-accessible server. Remember, a searchable listing is a file containing Internet-capable statements. The entity formats or converts their IVR menu of prompts into statements that can be communicated across the World Wide Web. The entity's searchable listing is a file that contains these statements. The searchable listing may then be queried and searched, as may be other webpage postings. That searchable listing is then stored on a computer server. The computer server accepts queries for searching the searchable listing.

The business or corporate entity may also provide a mapping of telephone numbers. As FIGS. 8 and 9 illustrated, a preliminary query may be made to determine whether a telephone number is associated with one or more searchable listings. Many businesses may post their searchable listings on the World Wide Web, so the preliminary query is performed to determine which searchable listing is associated with a telephone number. The look-up database, for example, maps telephone numbers to searchable listings. A business stores a mapping of telephone numbers to their searchable listing(s) on a publicly-accessible server.

FIG. 17 is a flowchart illustrating a computer-implemented method for searching a searchable listing of an Interactive Voice Response (IVR) system. A search request comprising a search term is received (Block 200). The search term may be a telephone number (Block 202). A first query may be performed to determine whether the telephone number is associated with a searchable listing (Block 204). A second query may be performed to determine whether the search term occurs within in the searchable listing (Block 206). A search result of the query is received (Block 208). The search result may be a communications address associated with the search term (Block 210). The search result may be a quick code comprising a string of sequential responses for the IVR system (Block 212). The search result may be a tag having a text string that matches the search term (Block 214). The tag describes at least one of a genre, a category, and a subcategory associated with the searchable listing. The search result may also comprise related data associated with the tag (Block 216). The search result is communicated to a client (Block 218).

The query handler application (shown as reference numeral 24 in the FIGS. 1-14) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the query handler to be easily disseminated. A computer program product comprises the query handler stored on the computer-readable medium. The query handler comprises computer-readable instructions/code for searching a searchable listing of an Interactive Voice Response (IVR) system.

The exemplary embodiments may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
 converting an interactive voice response menu of prompts into a web page comprising a graphical version of the interactive voice response menu of prompts;
 storing the web page in memory;
 receiving, at a server, a search request sent from a requesting device, the search request comprising a communications address as a search term;
 searching the web page for the communications address;
 determining a match between the communications address and a portion of the web page;
 receiving a tag in response to the match that is assigned to the portion of the web page, the tag describing a category and a subcategory associated with a hierarchical tree branch of the interactive voice response menu of prompts;
 retrieving a quick code of sequential responses to the hierarchical tree branch of the interactive voice response menu of prompts;
 sending the quick code and the tag as a response to the search request;
 receiving a call at the interactive voice response menu of prompts;
 receiving the quick code as inputs to the interactive voice response menu of prompts; and
 navigating to the hierarchical tree branch represented by the quick code.

2. The method according to claim 1, further comprising receiving an index to a point of origin for the graphical version of the interactive voice response menu of prompts.

3. The method according to claim 1, further comprising sending the quick code and the tag to a client device.

4. The method according to claim 1, further comprising tagging the hierarchical tree branch with the communications address.

5. The method according to claim 1, further comprising sending the graphical version of the hierarchical tree branch as the response to the search request.

6. The method according to claim 1, further comprising sending a graphical icon with the quick code, the icon when selected causing the inputs that navigate to the hierarchical tree branch represented by the quick code.

7. The method according to claim 1, further comprising storing a database of searchable listings that associates different communications addresses to different graphical versions of interactive voice response menus of prompts.

8. A system, comprising:
a processor; and
memory storing code stored that when executed causes the processor to:
convert an interactive voice response menu of prompts into a web page comprising a graphical version of the interactive voice response menu of prompts;
store the webpage in the memory;
receive a search request sent from a requesting device, the search request comprising a communications address as a search term;
search the web page for the communications address;
determine a match between the communications address and a portion of the web page;
receive a tag in response to the match that is assigned to the portion of the web page, the tag describing a category and a subcategory associated with a hierarchical tree branch of the interactive voice response menu of prompts;
retrieve a quick code of sequential responses to the hierarchical tree branch of the interactive voice response menu of prompts;
send the quick code and the tag as a response to the search request;
receive a call at the interactive voice response menu of prompts;
receive the quick code as inputs to the interactive voice response menu of prompts; and
navigate to the hierarchical tree branch represented by the quick code.

9. The system according to claim 8, further comprising code that causes the processor to receive an index to a point of origin for the graphical version of the interactive voice response menu of prompts.

10. The system according to claim 8, further comprising code that causes the processor to send the quick code and the tag to a client device.

11. The system according to claim 8, further comprising code that causes the processor to tag the hierarchical tree branch with the communications address.

12. The system according to claim 11, further comprising code that causes the processor to send the graphical version of the hierarchical tree branch as the response to the search request.

13. The system according to claim 11, further comprising code that causes the processor to send a graphical icon with the quick code, the icon when selected causing the inputs that navigate to the hierarchical tree branch represented by the quick code.

14. The system according to claim 8, further comprising code that causes the processor to store a database of searchable listings that associates different communications addresses to different graphical versions of interactive voice response menus of prompts.

15. A memory storing code that when executed causes a processor to perform a method, the method comprising:
converting an interactive voice response menu of prompts into at least one a web page comprising graphical branches of a graphical version of the interactive voice response menu of prompts;
storing the web page in the memory;
receiving a search request sent from a requesting device, the search request comprising a communications address as a search term;
searching the web page for the communications address;
determining a match between the communications address and a portion of the web page;
receiving a tag in response to the match that is assigned to the portion of the web page, the tag describing a category and a subcategory associated with a hierarchical tree branch of the interactive voice response menu of prompts;
retrieving a quick code of sequential responses to the hierarchical tree branch of the interactive voice response menu of prompts;
sending the quick code and the tag as a response to the search request;
receiving a call at the interactive voice response menu of prompts;
receiving the quick code as inputs to the interactive voice response menu of prompts; and
navigating to the hierarchical tree branch represented by the quick code.

16. The memory according to claim 15, further comprising code that causes the processor to receive an index to a point of origin for the graphical version of the interactive voice response menu of prompts.

17. The memory according to claim 15, further comprising code that causes the processor to tag the hierarchical tree branch with the communications address.

18. The memory according to claim 15, further comprising code that causes the processor to send a graphical icon with the quick code, the icon when selected causing the inputs that navigate to the hierarchical tree branch represented by the quick code.

19. The memory according to claim 15, further comprising code that causes the processor to store a database of searchable listings that associates different communications addresses to different graphical versions of interactive voice response menus of prompts.

* * * * *